Feb. 6, 1923.

A. MONSEN.
SELF PROPELLED VEHICLE.
FILED MAR. 20, 1919.

A. MONSEN.
SELF PROPELLED VEHICLE.
FILED MAR. 20, 1919.

Witnesses:

Inventor.
Adolph Monsen

Patented Feb. 6, 1923.

1,443,963

UNITED STATES PATENT OFFICE.

ADOLPH MONSEN, OF LOGANSPORT, INDIANA, ASSIGNOR OF ONE-FOURTH TO WILLIAM G. CALLAHAN, OF CHICAGO, ILLINOIS.

SELF-PROPELLED VEHICLE.

Application filed March 20, 1919. Serial No. 283,689.

*To all whom it may concern:*

Be it known that I, ADOLPH MONSEN, a citizen of the United States, residing at Logansport, in the county of Cass and State of Indiana, have invented certain new and useful Improvements in Self-Propelled Vehicles, of which the following is a specification.

This invention relates to improvements in self propelled or motor vehicles and more particularly to traction devices or attachments therefor, the principal object being the provision of means for increasing the traction of the vehicle, particularly under unfavorable operating conditions, that is on hills, or when the traction surface is unsuited for ordinary traffic, as when covered with snow or ice or in a muddy condition, or the like.

A further object of this invention is the provision of such a device which may be readily raised and lowered to and from its operative position from the same source of power which operates the vehicle, the traction device itself being operated from the same source of power.

A further object of this invention is the provision of such a device which may be manufactured and installed in the form of an attachment, as it is applicable to vehicles of various kinds, the embodiment illustrated in the drawing being applied to a truck.

A further object of this invention includes improvements in details of construction and arrangement, whereby simple and efficiently operating mechanism of the type described is provided.

To the accomplishment of the foregoing and such other objects as may hereinafter appear my invention consists in the construction, combination and arrangement of parts hereinafter described and then sought to be defined in the appended claims, reference being had to the accompanying drawings forming a part hereof and which show, merely for the purpose of illustrative disclosure, a preferred embodiment of my invention, it being expressly understood however that various changes may be made in practice within the scope of the claims without digressing from our inventive idea.

In the drawings—

Figure 1:
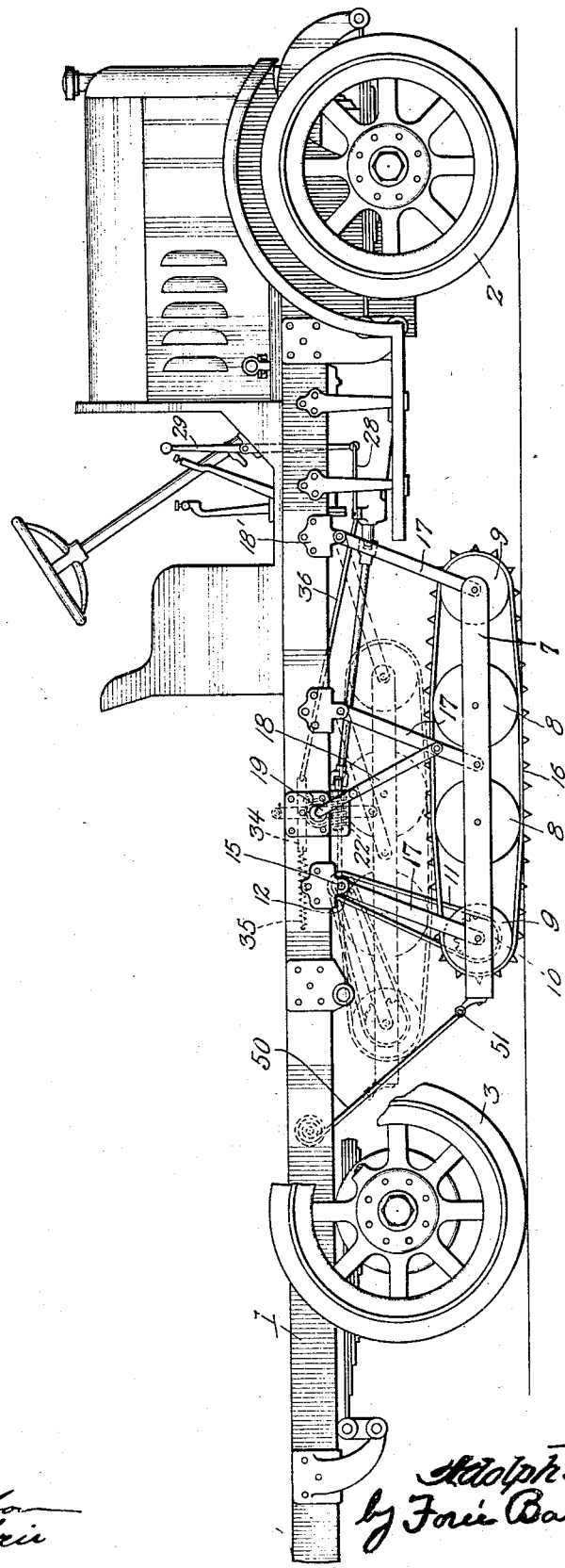
Fig. 1 represents a side elevation of a mechanism constructed according to my invention applied to a standard form of truck, the lowered or operating position of the mechanism being shown in full lines and the raised or non-operating position of the mechanism being indicated in dotted lines in said figure.

It is well known that under certain conditions of the traction surface, as for instance when the roads are muddy, icy or deep with snow or in hilly country, considerable difficulty is encountered in operating the ordinary four wheel vehicle and as a matter of fact, it is impossible under certain conditions of the roads to operate them successfully and it is to overcome this difficulty that this invention has been evolved.

Referring now to the drawings, the numeral 1 represents the frame or chassis of a motor vehicle, shown in the form of a truck, supported and driven by the front and rear wheels 2 and 3 and having the usual motor or power plant and steering mechanism, all of which parts are of usual or standard construction and form no part of my invention, as it is to be expressly understood that embodiments of my invention may be attached to or built in connection with self propelled vehicles of various kinds and types.

Figure 2:
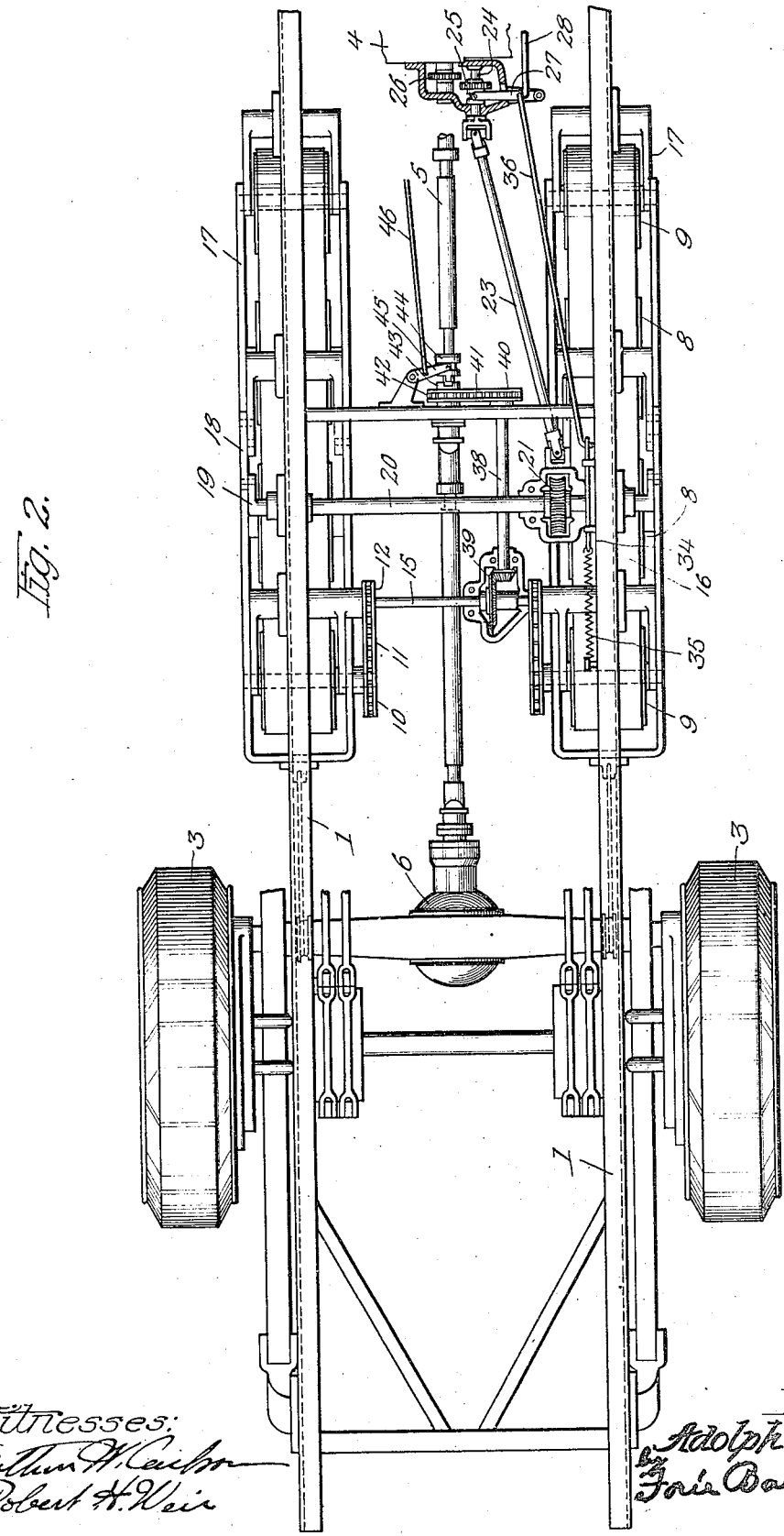
Fig. 2 is a top plan view on a somewhat larger scale of the chassis of the truck and the mechanism constructed to embody my invention applied thereto.

Going into slightly greater detail in the interest of an explicit disclosure, reference is had particularly to Fig. 2, wherein the reference character 4 designates the transmission generally, 5 the propeller shaft, leading to the differential 6, for driving the rear axle and wheels, as is well understood.

This invention includes particularly a traction device suspended from the frame or chassis of the vehicle, one on each side thereof, intermediate the front and rear wheels thereof, the traction element itself being in the form of an endless belt or track driven over suitable pulleys or the like. Each of these traction devices includes the frame 7, which is of a substantially elongated U-shape in the plan, between the side arms of which the support pulleys 8 and the suspension pulleys 9 are journaled for rotation. One of pulleys 9 is provided with a suitable sprocket 10 which is rotated by means of chain or belt 11, from the pulley or driving sprocket 12 on the transverse driving shaft 15, which is suitably supported in the frame or chassis 1 of the vehicle and extends entirely across the same. The traction device itself comprises the endless chain or belt 16 which passes over the pulleys 8 and 9 and which may have operative connection with the pulley 9 by means of teeth or chain links, as desired.

The frame of each traction device and consequently the traction device itself is supported from the frame or chassis 1 of the vehicle by means of the suspension arms 17, the lower ends of which are connected to the frame 7 of the traction device and the upper ends of which are pivotally supported from the frame or chassis 1 of the vehicle by means of the brackets 18'. Connecting links 18 are connected to the intermediate suspension bars at their lower ends and at their upper ends are connected to the crank arms 19 on the ends of transverse shaft 20 which extends entirely across the main frame or chassis 1 and is suitably journaled therein.

On one side this shaft is provided with the worm wheel 21, which is driven by means of the worm 22 and propeller shaft 23 from the counter-shaft 24. On counter shaft 24, a gear or pinion 25 is slidably mounted and adapted to be moved into and out of mesh with gear 26 on the transmission counter shaft. Gear 25 is moved by lever 27 having a usual link connection 28 with lever 29 positioned convenient to the operator. It is therefore obvious that when the operator moves the gear 25 into mesh with the gear 26 the propeller shaft 23 will be rotated, causing movement of the traction device thru the worm gear and worm connection and the crank members 19, one-half rotation of the shaft 20 being sufficient to lower the traction device and the other half revolution of the shaft 20 being sufficient to raise the traction device.

Figure 3:
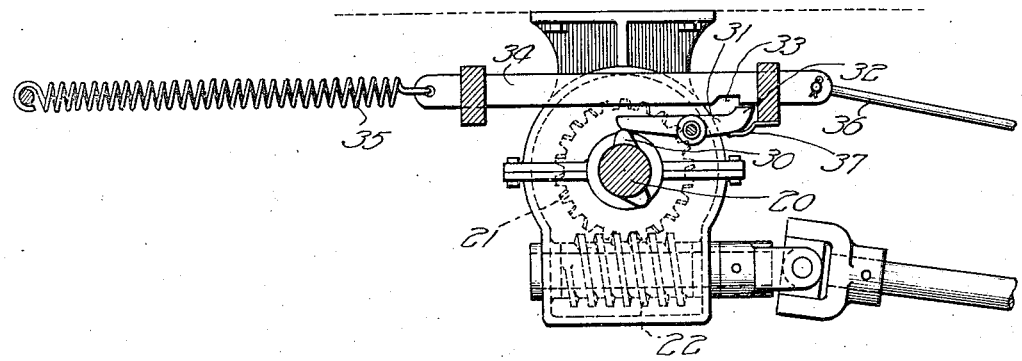
Fig. 3 is a detail view showing in section and elevation the automatic release or throw-out mechanism which limits the raising and lowering movement of the traction devices.
Figure 4:
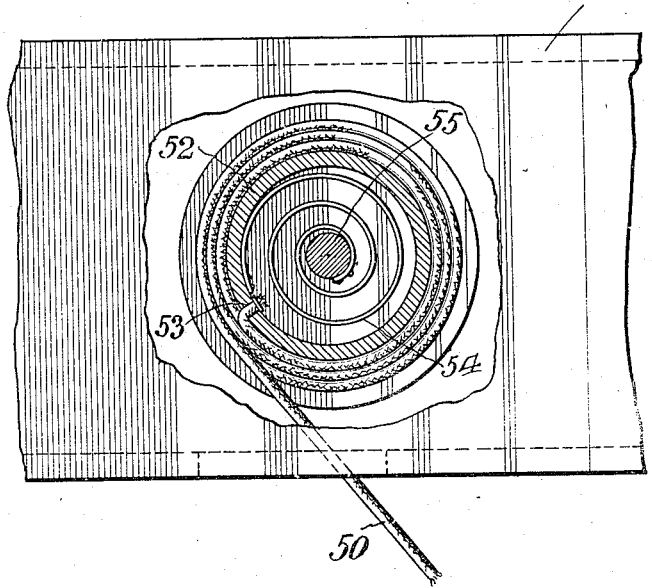
Fig. 4 is a detail section of the spring drum for winding and unwinding the supporting cable for one end of the frame of the traction device.

In this connection, means is provided for automatically throwing gear 25 out of mesh with gear 26 when the traction device reaches the limit of its lowering or raising movement. This means includes a pair of cams 30 secured to the traverse shaft 20 in the path of movement of which is located the latch or lever 31 suitably pivoted and having the engaging end 32 adapted to be moved into notch 33 in the bar 34 slidable in suitable frame parts and having a spring 35 connected to one end and a rod or link 36 connected to the other end, which rod or link 36 is also connected to the operating lever 27 for shifting gear 25. It is, therefore, seen that when the operator moves the operating lever 29 to shift gear 25 into mesh with gear 26, the bar 34 will be moved so that the engaging end 32 of the latch or lever 31 will be forced into the notch 33 by means of the spring member 37, whereby the gear 25 is held in mesh with the gear 26 until one of the cams engages the free end of the lever or latch 31, lifts the same and moves the engaging end 32 out of the notch or recess 33 of the lever 34, whereby the same is moved to the left, referring to Fig. 3, under the influence of the spring 35, causing the withdrawal of the movable gear 25 from engagement with the gear 26 and immediately stopping the rotation of shaft 20. The same operation occurs during the raising movement of the traction device, the other cam 30 operating automatically to move the gear 25 out of engagement with the gear 26 to stop the rotation of the shaft 20 and the raising movement of the traction device, when it has reached the proper point in said raising movement.

It is to be recalled the shaft 15 drives the operating mechanism for driving the traction means proper of each device. This shaft 15 is operated by means of a suitable counter shaft 38, thru a beveled gear and differential connection 39, see Fig. 2 of the drawing, the shaft 38 being driven by a suitable pulley or sprocket 40, belt or chain 41, and pulley or sprocket 42, loosely mounted on the propeller shaft 5, and having its hub provided with a clutch part 43 which is adapted to be engaged by a movable clutch member 44 actuated by lever 45 and the links 46 by the operator, as is well understood. It is, therefore, seen that it is only necessary to move the clutch member 44 into engagement with the clutch part 43 of pulley 42 to cause a driving connection to be established between the traction device and the source of power.

The cable 50 is connected by one end to the frame 7, as at 51, its other end is connected to a drum 52, as at 53. Within the drum is a lifting spring 54 secured to the rotatively stationary stud shaft 55 about which the drum rotates. By this means less power is required to lift the frame 17.

It is to be noted that I have duplicated the traction devices, positioning one on each side of the frame. They are both of the same construction so that a description of one suffices for both. It is, therefore, to be seen that I have provided a simple construction of auxiliary traction device which is driven from the same source of power which drives the vehicle on which the same is mounted and the raising and lowering of which is accomplished by connections from the same source of power. The operation and control of the same is simple and effective. The device may be built in as part of a motor vehicle, or may be readily installed as an attachment thereto.

Having described my invention what I claim is:—

1. A self-propelled vehicle having a motor to drive the vehicle wheels, an auxiliary traction device carried by the vehicle and movable to and from tractive position, means actuated by the vehicle motor to move said device to and from tractive position, driving connections interconnecting the motor and device independently of the drive for the vehicle wheels; and an automatic controller for interrupting the driving connections when the auxiliary traction device is moved into tractive position and into non-tractive position.

2. The combination with a self-propelled vehicle having a motor to drive the vehicle wheels, of an auxiliary traction device for attachment to the vehicle, power connections through which the motor may move the device to and from tractive position, means for interrupting the power connections when the device has been moved to tractive and non-tractive positions, and power connections independent of the drive to the vehicle wheels and interconnecting the motor and said device so that the device may be driven to supplement the traction of the vehicle wheels.

3. An auxiliary traction device for a vehicle wherein the wheels are driven by a motor, comprising a frame pivoted to the vehicle, a pair of pulleys journaled on said frame, an endless belt passing over the pulleys, power connections between the motor and the frame and through which the motor moves the frame to carry the belt to and from tractive position, power transmitting means between the motor and the belt and through which the motor drives the belt to supplement the traction of the vehicle wheels, and means for automatically interrupting the power connection between the motor and the frame when the frame is moved into tractive position and into a predetermined non-tractive position.

4. A traction device for motor vehicle including a frame on each side of the frame of said motor vehicle, means for suspending said frames from the frame of the motor vehicle, each of said frames having an endless traction device thereon, means for driving said traction devices from the source of power of said vehicle, said means including a clutch whereby operative connection is to be made and broken with said source of power and also including a differential between said two traction devices, and means for raising and lowering said traction devices; operative connections between said raising and lowering means to automatically disconnect the source of power of the vehicle from said raising and lowering means.

5. A traction device adapted to be used in connection with a motor vehicle including a frame, pulleys mounted in said frame, endless traction means operable over said pulleys, means for suspending said frame from the frame of the vehicle, means for driving said traction means from the source of power of the vehicle including a driving shaft, a counter shaft and a manually controlled clutch connection between the counter shaft and said source of power and means for raising and lowering said frame from the source of power of the vehicle including a shaft, a crank on the shaft connected to one of said suspension means and a manually actuated gear connection between said shaft and the said source of power.

6. A traction device adapted to be used in connection with a motor vehicle including a frame, pulleys mounted in said frame, endless traction means operable over said pulleys, means for suspending said frame from the frame of the vehicle, means for driving said traction means from the source of power of the vehicle including a driving shaft, a counter shaft and a manually controlled clutch connection between the counter shaft and said source of power and means for raising and lowering said frame from the source of power of the vehicle including a shaft, a power driven crank on the shaft connected to one of said suspension means and a manually actuated gear connection between said shaft and the said source of power and automatic means for breaking said gear connection at the upper and lower limits of the movement of said frame.

7. An auxiliary traction device for a vehicle having motor driven supporting wheels, comprising an endless belt movably supported from the vehicle so that the belt may be swung into and out of tractive position, means actuated by the vehicle motor to so move the belt into and out of tractive position, a clutch automatically controlled by said means and acting to disconnect the vehicle motor therefrom when the belt is in tractive position and a predetermined distance out of tractive position, and power connections between the vehicle motor and the belt and driving the belt to assist the traction of the supporting wheels.

8. A traction device for motor vehicles comprising a frame adapted to be positioned on each side of the frame of the motor vehicle, a set of pulleys mounted in each frame, an endless traction device running over each set of pulleys and means for driving said traction devices, means for raising and lowering said frames including a transverse shaft, a crank on each end thereof operatively connected to each frame and means connecting said transverse shaft with the transmission of the motor vehicle including a manually made operating connection.

9. A traction device for motor vehicles comprising a frame adapted to be positioned on each side of the frame of the motor vehicle, a set of pulleys mounted in each frame, an endless traction device running over each set of pulleys and means for driving said traction devices, means for raising and lowering said frames including a transverse shaft, a crank on each end thereof operatively connected to each frame and means connecting said transverse shaft with the transmission of the motor vehicle including a manually made operating connection and means for automatically breaking said connection at the upper and lower limit of the path of movement of said frame.

In testimony whereof I hereunto subscribed my name.

ADOLPH MONSEN.